United States Patent [19]

Stapp et al.

[11] Patent Number: 5,392,964
[45] Date of Patent: Feb. 28, 1995

[54] ROTARY FEEDER FOR FLOWABLE MATERIALS

[75] Inventors: Georg Stapp, Dreieichenhain; Wolfhard Rumpf, Rödermark; Paul G. Dellmann, Darmstadt, all of Germany

[73] Assignee: Dietrich Reimelt KG, Rodermark/Urberach, Germany

[21] Appl. No.: 57,991

[22] Filed: May 5, 1993

[30] Foreign Application Priority Data

May 6, 1992 [DE] Germany .............................. 4214467

[51] Int. Cl.$^6$ ...................... B65G 29/02; B65G 65/48; G01F 11/24
[52] U.S. Cl. ...................... 222/368; 277/59; 277/165; 414/219
[58] Field of Search ............... 222/344, 367, 368, 410, 222/542, 630, 636; 414/219, 220; 277/58, 59, 70, 71, 165

[56] References Cited

U.S. PATENT DOCUMENTS

| | | | |
|---|---|---|---|
| 2,766,911 | 10/1956 | Greaves et al. | 222/368 X |
| 2,879,094 | 3/1959 | Transeau | . |
| 3,052,383 | 9/1962 | Transeau | 222/368 X |
| 3,077,272 | 2/1963 | Reinhall | 222/368 X |
| 3,851,888 | 12/1974 | Limpson, Jr. et al. | 277/165 X |
| 3,860,250 | 1/1975 | Lundquist | 277/165 |
| 3,910,428 | 10/1975 | Peterson, II | 222/368 X |
| 3,923,125 | 12/1975 | Rosenthal | 222/368 X |
| 4,179,131 | 12/1979 | Nussbaumer | 277/165 |
| 4,228,932 | 10/1980 | Aonuma et al. | 222/368 |
| 4,531,746 | 7/1985 | Amdall et al. | 277/59 X |
| 4,565,305 | 1/1986 | Fischer et al. | 222/368 |
| 4,946,078 | 8/1990 | Heep et al. | 222/368 |
| 5,201,441 | 4/1993 | Hoppe et al. | 222/368 |

FOREIGN PATENT DOCUMENTS

| | | | |
|---|---|---|---|
| 692378 | 8/1964 | Canada | 222/368 |
| 0462500A1 | 12/1991 | European Pat. Off. | . |
| 2419241 | 10/1979 | France | . |
| 8813815.1 | 11/1988 | Germany | . |
| 4019627 | 1/1992 | Germany | . |
| 57-40169 | 3/1982 | Japan | . |
| 3195634 | 8/1991 | Japan | 222/368 |
| 2189775 | 11/1987 | United Kingdom | 222/368 |

*Primary Examiner*—Kevin P. Shaver
*Attorney, Agent, or Firm*—Darby & Darby

[57] ABSTRACT

A rotary feeder wherein a housing defines a cylindrical internal chamber with an inlet for a flowable material and an outlet spaced from the inlet in the circumferential direction of the chamber. The chamber receives a rotor with a shaft having stubs journalled in pairs of adjustable antifriction bearings in the housing, two spaced-apart end walls on the shaft in the chamber, and a set of vanes extending from the shaft radially outwardly between the two end walls. The internal surface of the housing has a radial groove surrounding the peripheral surface of each end wall, an elastomeric seat in the bottom portion of each groove, and an annular seal disposed in each groove radially inwardly of the seat and biased by the seat against the peripheral surface of the adjacent end wall. The seats are in sealing engagement with the surfaces bounding the respective grooves as well as in sealing engagement with the respective seals which are biased into requisite sealing engagement with the adjacent end walls.

27 Claims, 4 Drawing Sheets

ROTARY FEEDER FOR FLOWABLE MATERIALS

BACKGROUND OF THE INVENTION

The invention relates to gates in general, and more particularly to improvements in gates of the type known as cell wheels or Rotary feeders (hereinafter called rotary feeders).

A rotary feeder comprises a housing having an inlet and an outlet spaced apart from and connected to the inlet by an internal chamber, particularly a cylindrical chamber. The chamber receives a rotor including a shaft which is rotatably journalled in the housing and carries two spaced-apart end walls as well as a plurality of radially extending vanes or blades between the end walls. When the shaft is driven, either by a motor or by a flowable material which is admitted at the inlet, batches of flowable material are caused to advance in the cells or compartments between neighboring vanes and are discharged through the outlet. The peripheral surfaces of the end walls can sealingly engage the adjacent portions of the internal surface of the housing to thus confine the batches of material to advancement from the inlet, within a portion of the chamber and toward and through the outlet. It is also known to provide the internal surface of the housing with annular grooves which are outwardly adjacent the peripheral surfaces of the end walls and receive seals serving to engage the respective peripheral surfaces and to thus enhance the sealing action between the end walls and the housing.

In many instances, a rotary feeder of the above outlined character will be utilized to transport batches of flowable solid material from a first space at the inlet of the housing to a second space at the outlet of the housing. The pressure in the first space can be less, e.g., considerably less, than the pressure in the second space. Such situation can develop when the rotary feeder is installed in a pneumatic conveyor system, and it is normally desirable to ensure that pressurized fluid (such as air or another gaseous fluid) cannot flow from the second space (e.g., a plenum chamber) back toward the first space, e.g., a suction chamber or a chamber wherein the pressure does not or need not appreciably exceed atmospheric pressure. Since the conveying of batches of flowable material from the inlet to the outlet involves angular movement of the rotor relative to the housing, the extent of leakage of pressurized fluid from the outlet toward the inlet depends on the quality of sealing action between the rotor and the housing of the rotary feeder. This creates problems because the rotor must be installed in the housing with at least some (even extremely small) radial play in order to avoid jamming of the rotor shaft and/or of the end walls in the housing. Even slight radial movability of the rotor results in radial displacement of the shaft and of the parts which are mounted on the shaft because such radial displacement is induced by the pressure differential between the outlet and the inlet of the housing. It has been found that a seemingly negligible radial play of the rotor in the housing often results in the establishment of a rather pronounced gap which provides a path for the flow of pressurized gaseous fluid from the higher-pressure space (normally the space in communication with the outlet) toward and into the lower-pressure space (normally the space which communicates with the inlet of the housing). Such paths cannot be readily sealed without unduly increasing friction between the rotor and the housing of a rotary feeder.

European patent application Serial No. 0 462 501 A1 of Waeschle (published Dec. 27, 1991) discloses a rotary feeder wherein a sealing device is installed between the rotor and the housing at one side of the rotor. The inventor proposes to employ a slidable ring which surrounds the shaft of the rotor and is movably installed in a radial internal groove of the housing. A supporting flange is affixed to an end wall of the rotor and carries two O-rings which sealingly engage the housing. If the rotor is caused to perform a radial movement, the flange is caused to temporarily engage the slidable ring and displaces the latter radially in the housing. This is intended to ensure that the sealing action between the rotor and the housing of the cell wheel will remain intact. A drawback of the proposal of Waeschle is that any shifting of the rotor entails the application of a one-sided force to the slidable ring which results in deformation of the ring due to the development of a counter force as a result of friction. The non-uniformly deformed slidable ring causes the development of a non-uniform clearance. Each change of load results in an abrupt impact of the rotor against the slidable ring which, in turn, causes a progressive widening of the gaps and uncontrolled escape of pressurized fluid.

German patent application Serial No. 40 19 627 A1 of Waeschle (published Jan. 9, 1992) discloses a modified rotary feeder with a housing which receives a container having openings at the inlet and at the outlet of the housing. The external surface of the container is surrounded, at least in part, by an elastomeric flange which causes the container to flow in the housing. Such construction is costly and complex and, in addition, still fails to establish a satisfactory sealing action for the end walls of the rotor.

OBJECTS OF THE INVENTION

An object of the invention is to provide a rotary feeder wherein the sealing action between the end walls of the rotor and the adjacent portions of the housing is more satisfactory than in heretofore known rotary feeders.

Another object of the invention is to provide a novel and improved housing for use in the above outlined rotary feeder.

A further object of the invention is to provide a rotary feeder with novel and improved seals for the end walls of the rotor.

An additional object of the invention is to provide a rotary feeder with novel and improved means for journalling the shaft of its rotor in the housing.

Still another object of the invention is to provide a rotary feeder which is assembled of simple and inexpensive parts but is still capable of establishing highly satisfactory seals at the axial ends of its rotor.

A further object of the invention is to provide a conveyor which employs a rotary feeder of the above outlined character.

SUMMARY OF THE INVENTION

One feature of the present invention resides in the provision of a rotary feeder which comprises a housing having an inlet, an outlet and a chamber between the inlet and the outlet. The rotary feeder further comprises a rotor which is installed in the chamber and has a shaft which is journalled in the housing, two spaced-apart end walls which are provided on the shaft, which flank the inlet and the outlet and which have peripheral surfaces adjacent the housing, and preferably substantially radially disposed vanes or blades which extend from the shaft between the end walls and establish an annulus of cells or compartments surrounding the shaft between the two end walls. The improved rotary feeder further comprises a sealing device between each peripheral surface and the housing, and each such sealing device comprises a ring-shaped seal disposed in an annular groove of the housing adjacent the respective peripheral surface and means for biasing the seal radially inwardly against the respective peripheral surface. Each biasing means can comprise an elastomeric seat in the respective groove, and each seal is disposed between the respective seat and the respective peripheral surface. At least one of the two seats can comprise a circumferentially complete ring of elastomeric material.

Each seat can be maintained in sealing engagement with a bottom wall forming part of the housing and disposed in the deepest (i.e., radially outermost) portion of the respective groove, as well as with the respective seal. Thus, each seal is in sealing engagement with the respective peripheral surface and with the adjacent seat, and the latter is in sealing engagement with the housing in the interior of the respective groove to thus prevent leakage of fluid from the outlet, axially along the peripheral surfaces of the end walls of the rotor and into the interior of the housing at the outer sides of the end walls.

The arrangement may be such that each seat biases the respective seal into frictional engagement with the respective peripheral surface with a first force, and that the seats bear against the housing in the respective grooves as well as against the adjacent seals with a second force greater than the first force. This reduces the likelihood of jamming of the rotor in the housing and prevents the seals from rotating with the end walls.

The improved rotary feeder can further comprise a gasket provided in the housing adjacent the peripheral surface of each end wall. Each such ring can define with the respective peripheral surface and the adjacent seal an annular plenum chamber, and the housing is then provided with means for supplying into the plenum chambers a pressurized fluid, e.g., air. The rings are disposed between the seals as seen in the axial direction of the shaft forming part of the rotor. The rings and the adjacent peripheral surfaces preferably define fluid conveying passages or paths, and each such path can constitute a substantially helical path. Furthermore, each end wall can define with the housing a fluid-containing additional chamber wherein the pressure at least matches that in the plenum chambers. Each seal can be disposed between the respective plenum chamber and the respective additional chamber (as seen in the axial direction of the rotor shaft). The means for supplying pressurized fluid to the plenum chambers can be connected to the additional chambers. For example, the housing can be provided with two means for supplying pressurized fluid, one for one of the plenum chambers and the associated additional chamber, and the other for the other plenum chamber and the associated additional chamber. Channels can be provided (e.g., in the end walls of the rotor) to connect the plenum chambers with the respective additional chambers. Each such channel can comprise or contain at least one flow restrictor to establish and maintain a desired pressure differential between the respective plenum chamber and the corresponding additional chamber.

The rotor shaft can include at least one stub, and the improved rotary feeder can be furnished with antifriction bearing means including at least one antifriction bearing surrounding the at least one stub and installed in the housing. Such housing can include a section adjacent the at least one antifriction bearing and including two portions and a slit between the two portions. At least one clamping element is provided to clamp the portions of the housing section to each other in a direction to narrow the slit. The shaft can include two stubs and the antifriction bearing means can comprise at least one adjustable antifriction bearing mounted in the housing for each stub. Each such bearing can have an inner race surrounding the respective stub, an outer race and at least one row (annulus) of spherical or other suitable antifriction rolling elements between the respective inner and outer races. A clamping unit can be loosened to thus permit axial adjustment of at least one race of the at least one bearing relative to the other race. It is often preferred to provide two antifriction bearings (e.g., ball bearings) for each stub of the rotor shaft. The aforementioned portions of the housing section can include flanges which confront each other and the at least one clamping element can comprise at least one bolt, screw or another threaded fastener which connects the flanges to each other. An annular sealing element can be provided in the housing around each of the stubs, each such sealing element is disposed between the corresponding antifriction bearing or bearings and the adjacent end wall of the rotor. The aforementioned additional (plenum) chambers at the outer sides of the end walls can receive a pressurized fluid along paths extending past the respective annular sealing elements.

Another feature of the present invention resides in the provision of a rotary feeder which comprises a housing having an inlet, an outlet spaced apart from the inlet and a chamber between the inlet and the outlet. The rotary feeder further comprises a rotor which is installed in the chamber and includes a shaft having at least one stub in the housing, two spaced-apart end walls provided on the shaft adjacent the housing and flanking the inlet and the outlet, and vanes or blades which extend from the shaft substantially radially outwardly between the two end walls. Still further, the rotary feeder comprises antifriction bearing means including at least one antifriction bearing which surrounds the at least one stub in the housing. A section of the housing is adjacent the at least one bearing and includes two portions and a clearance (e.g., a slit) between such portions. At least one clamping element is provided to clamp the two portions of the housing section to each other in a direction to narrow the slit. The shaft can comprise two stubs and the antifriction bearing means can comprise at least one antifriction bearing provided in the housing for each stub. Each such bearing preferably includes an inner race which surrounds the respective stub, an outer race and at least one row or annulus of suitable (e.g., spherical roller-shaped or needle-like) antifriction rolling elements between the respective inner and outer races.

A clamping unit can be loosened to thus permit axial adjustment of at least one race of a bearing relative to another race. It is presently preferred to provide a plurality of antifriction bearings around each stub of the rotor shaft. The portions of the aforementioned housing section can include or constitute flanges, and the at least one clamping element can include a threaded bolt, a screw or an analogous fastener which connects the flanges to each other.

An annular sealing element can be disposed in the housing around each stub of the rotor shaft between the respective antifriction bearing or bearings and the adjacent end wall of the rotor. The aforementioned (additional) plenum chambers can receive pressurized fluid which flows past the respective annular sealing elements.

The novel features which are considered as characteristic of the invention are set forth in particular in the appended claims. The improved rotary feeder itself, however, both as to its construction and the mode of assembling and operating the same, together with additional features and advantages thereof, will be best understood upon perusal of the following detailed description of certain presently preferred specific embodiments with reference to the accompanying drawings.

DESCRIPTION OF THE PREFERRED EMBODIMENTS

Figure 1:
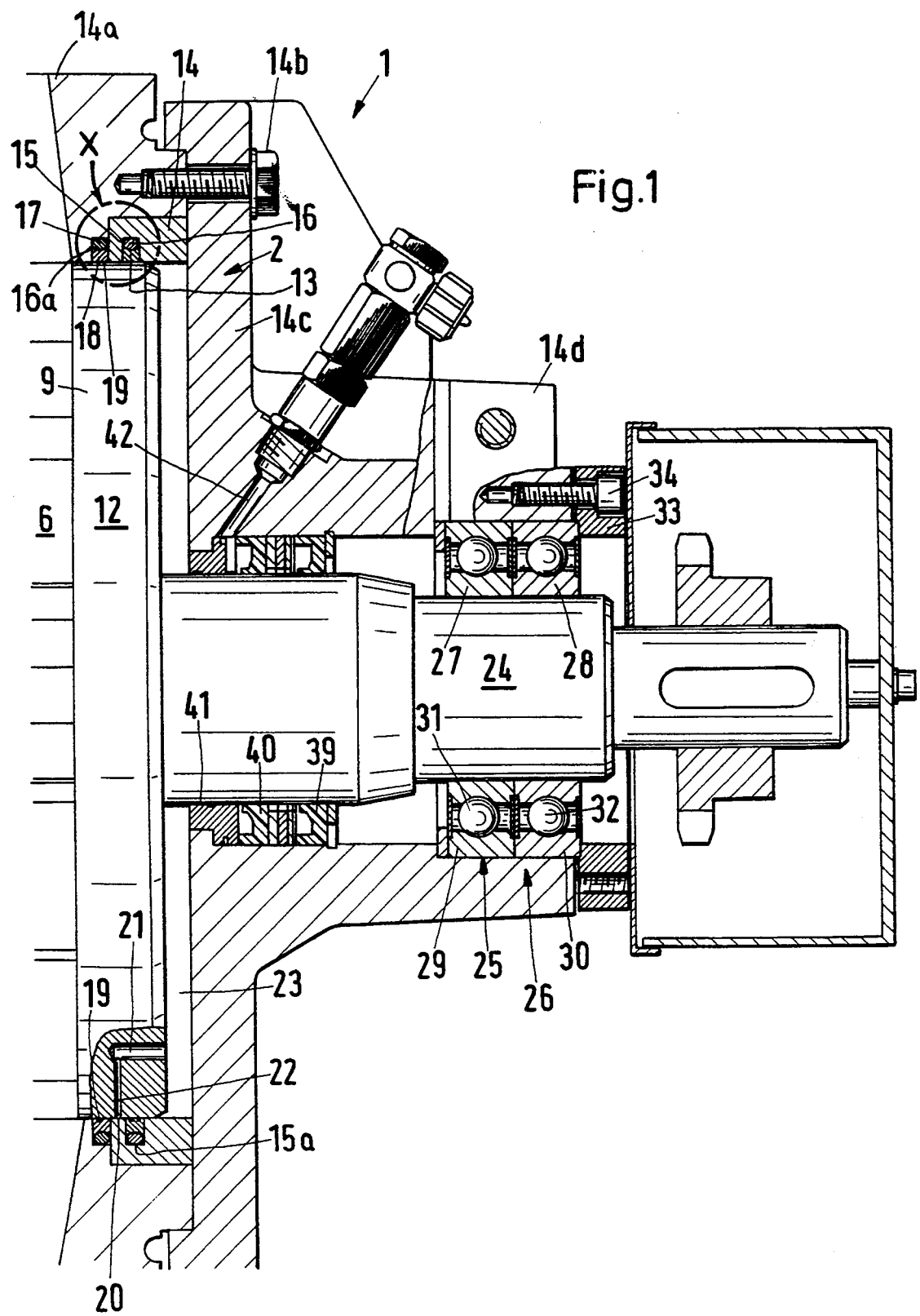
FIG. 1 is a fragmentary partly axial sectional view of a rotary feeder which embodies one form of the present invention, the section being taken in the direction of arrows as seen from the line I—I in FIG. 2.
Figure 2:
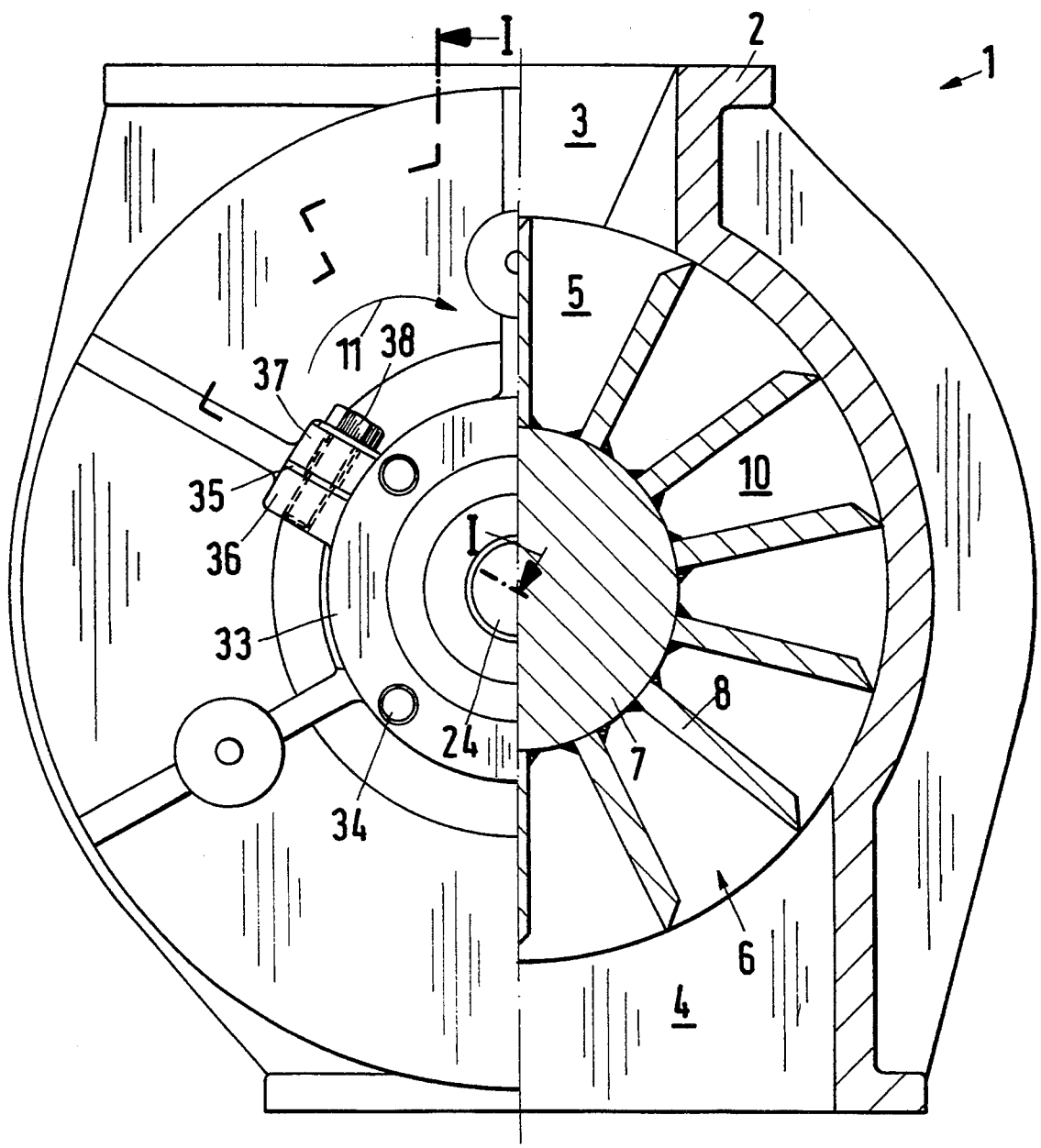
FIG. 2 is a partly end elevational and partly transverse sectional view of the rotary feeder which is shown in FIG. 1.
Figure 3:
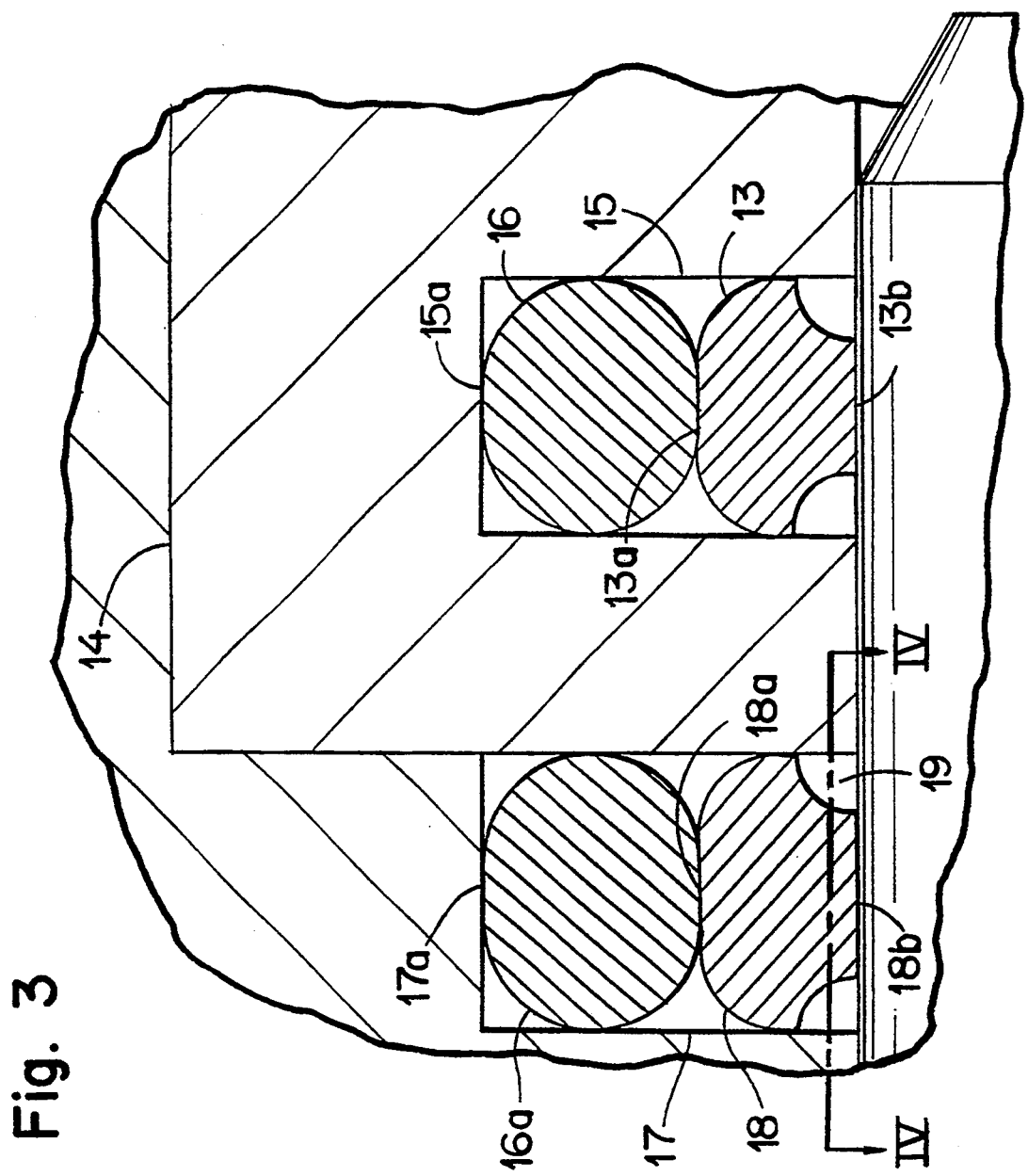
FIG. 3 is an enlarged view of section X of the rotary feeder as shown in FIG. 1.
Figure 4:
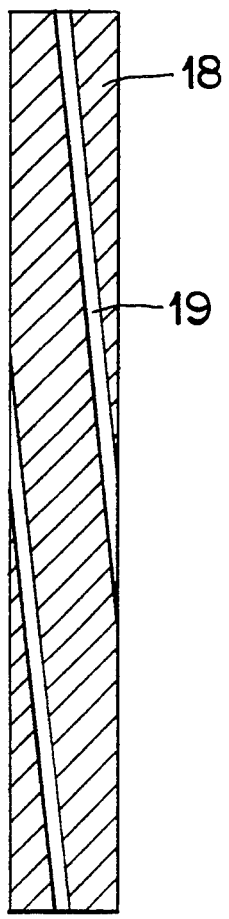
FIG. 4 is a cross sectional view of the rotary feeder along line IV—IV of FIG. 3.

The rotary feeder 1 which is shown in the drawings comprises a housing 2 having an inlet 3 at the twelve o'clock position, an outlet 4 at the six o'clock position and a substantially cylindrical internal chamber 5 between the inlet and the outlet. The chamber 2 confines a rotor 6 having a horizontal shaft 7 with two coaxial stubs 24 which are journalled in the housing 2, two spaced-apart coaxial end walls 9 (only one can be seen in each of FIGS. 1 and 2) which share all angular movements of the shaft 7, and a set of radially outwardly extending vanes or blades 8 which are welded or otherwise affixed to the shaft 7 and extend radially outwardly between the end walls 9. The tips of the vanes 8 move along the cylindrical internal surface of the housing 2 and each pair of neighboring vanes defines with the internal surface of the housing 2, with the two end walls 9 and with the adjacent portion of the peripheral surface of the shaft 7 a radially outwardly diverging cell or compartment 10 for the advancement of a batch of flowable material from the inlet 3 toward and into the outlet 4. The direction in which the shaft 7 is assumed to be driven by a motor or another suitable prime mover (not shown) or by the flowable material itself is indicated by the arrow 11. The flowable material which is to be transported in the form of discrete batches from the inlet 3 toward and into the inlet 4 can be a fibrous material (e.g., fragments of tobacco leaves), a granular or pulverulent material or any other substance which is to be delivered from a space communicating with the inlet 3 into a space which is in communication with the outlet 4. For example, the pressure at the outlet 4 can at least slightly exceed the pressure at the inlet 3 and, therefore, the improved rotary feeder 1 (which can constitute a component part of a pneumatic conveyor system) is designed (in a novel and improved way) to seal the inlet 3 from the outlet 4. However, it is equally within the purview of the invention to utilize the rotary feeder 1 under different circumstances, e.g., where the pressure at the inlet 3 is at least slightly higher than the pressure at the outlet 4. As a rule, a certain minimal flow of air or another gaseous fluid will take place between the inlet 3 and the outlet 4 regardless of the nature of the selected sealing action; however, it is often important or at least highly desirable to ensure that the flow of such fluid between the inlet and the outlet be kept to a minimum.

In accordance with a feature of the invention, the rotary feeder 1 comprises a novel and improved first sealing device between the internal surface of the housing 2 and the peripheral surface 12 of one of the end walls 9, and a preferably identical second sealing device between the internal surface of the housing 2 and the peripheral surface 12 of the other end wall 9. Since the two sealing devices are or can be identical, only one of these devices will be described and shown in full detail. The two sealing devices can be mirror images of each other with reference to a plane which is normal to the axis of the shaft 7 and is located midway between the two end walls 9.

The illustrated sealing device comprises a ring-shaped seal 13 which is received and is radially movable in the radially inner portion of a circumferentially complete groove or socket 15 machined into or otherwise formed in the internal surface of the housing 2 so that it is located opposite the cylindrical peripheral surface 12 of the adjacent end wall 9. The internal surface of the seal 13 is biased against the peripheral surface 12 by an elastomeric seat 16 which is received in the radially outer portion of the groove 15 and is installed in at least slightly prestressed condition so that it is maintained in sealing engagement with the bottom surface 15a forming part of the housing 2 and bounding the radially outermost portion of the groove 15. At the same time the seat 16 is maintained in sealing engagement with the external surface 13a of the seal 13, and the internal surface 13b of this seal is maintained in requisite sealing engagement with the peripheral surface 12. The arrangement is preferably such that the force with which the seal 13 is maintained in frictional engagement with the peripheral surface 12 is smaller than the force of frictional engagement of the seat 16 with the housing 2 and/or seal 13. The illustrated groove 15 is machined into or is otherwise formed in a first ring-shaped insert or housing portion 14 which can be said to constitute a separably produced portion of the housing 2 and is held in place by a second ring-shaped housing portion 14a with a set of bolts 14b and/or other suitable fasteners.

The illustrated seat 16 is a circumferentially complete ring which has a substantially circular or oval cross-sectional outline. This permits further radial and/or axial expansion of the seat 16 (if and when necessary), for example, to the extent which is needed to ensure that the material of the seat completely fills the groove 15 between the bottom surface 15a and the seal 13. At least some deformability (expandibility and/or contractibility) of the seat 16 ensures that the end wall 9 (and hence the entire rotor 6) has a certain freedom of radial movement relative to the housing 2; for example, such freedom of movement can be in the range of one or more tenths of one millimeter. The width of the annular clearance between the peripheral surface 12 of the end wall 9 and the internal surface of the second housing portion 14 is so small that it cannot be seen in the drawing; such clearance is provided in order to ensure that the radially innermost portion of the seal 13 can project radially inwardly beyond the groove 15 and into sealing contact with the peripheral surface 12.

The aforementioned difference between the force of frictional engagement of the seal 13 with the end wall 9 on the one hand and the force of frictional engagement of the seat 16 with the first housing portion 14 and the seal 13 on the other hand is desirable and advantageous because this ensures that the seal 13 does not turn in its groove 15, i.e., that the peripheral surface 12 moves along the internal surface of the seal 13 when the shaft 7 is driven by a prime mover and/or by the conveyed flowable material. Consequently, the seal 13 undergoes wear in the region of its radially innermost portion (of contact with the peripheral surface 12) but not in the regions of contact with the housing portion 14 and seat 16.

The groove 15 is outwardly adjacent a further groove or groove 17 which extends from the internal surface of the housing second portion 14a radially outwardly and away from the axis of the shaft 7. The groove 17 receives a gasket 18 and a seat 16a which are preferably identical with the seal 13 and the seat 16, respectively. The internal surface 18b of the gasket 18 is preferably provided with a substantially helical path or passage 19 which is adjacent the peripheral surface 12 of the end wall 9 while the external surface 18a is maintained in sealing engagement with the seat 16a. Such substantially helical passage 19 communicates with a ring-shaped first plenum chamber 20 which, in turn, communicates with a larger additional plenum chamber 23. The chamber 23 is outwardly adjacent the end wall 9 and surrounds the respective stub 24. The connection between the plenum chambers 20 and 23 includes at least one channel 21 having a flow restrictor 22. The axial channel 21 extends in parallelism with the axis of the shaft 7, and its flow restrictor 22 extends substantially radially of such axis. The illustrated channel 21 and its flow restrictor 22 are provided in the end wall 9. The relatively large additional plenum chamber 23 is defined by the end wall 9, first housing portion 14 and a further third housing portion 14c which rotatably mounts sealing elements 39, 40, 41 surrounding the larger-diameter portion of the respective stub 24.

The smaller-diameter portion of the illustrated stub 24 is mounted in the inner races 27, 28 of two antifriction ball bearings 25, 26, respectively. The outer races 20, 30 of the respective bearings 25, 26 are installed in a fourth housing portion or section 14d and the right-hand end face of the outer race 30 is urged against the outer race 29 by a clamping unit including a clamping ring 33 held in position on the fourth housing section 14d by one or more bolts 34 and/or other suitable fasteners. The illustrated antifriction bearings 25, 26 respectively comprise single rows of spherical rolling elements 31 and 32; however, it is equally possible to provide each of these antifriction bearings with two or more rows or annuli of rolling elements and/or to reduce the number of antifriction bearings to one or to increase their number to three or more and/or to employ rolling elements in the form of barrels, needles or the like. The inner races 27, 28 can be shrunk onto a press fit on or otherwise fixedly secured to the sub 24. Axial adjustability of the outer races 29, 30 relative to each other and/or relative to the sub 24 is desirable and advantageous because this renders it possible to eliminate play, if any, between the inner and outer races and the rolling elements of the respective bearings. The clamping ring 33 of the illustrated clamping unit bears against the radially outer portion of the outer race 30 but is spaced apart from the adjacent radially extending side face of the third housing portion 14c. The latter is indirectly connected to the clamping ring 33 by the bolt or bolts 34. Thus, by tightening the bolt 34, one can urge the outer race 30 with a greater force against the outer race 29 to thus eliminate play (if any) between such outer races and the respective rolling elements 31, 32. The clamping ring 33 is preferably secured to the third housing section 14c by an entire annulus of bolts 34 or other suitable fasteners.

The fourth housing portion or section 14d has two radially extending portions in the form of flanges 37, 36 separated from each other by a clearance in the form of a narrow slit 35 extending radially of the antifriction bearings 25, 26. The width of the slit 36 can be altered by a clamping element 38 in the form of a bolt or screw having a head abutting the flange 37 and an externally threaded shank extending into a tapped bore or hole of the flange 36. The fourth housing section 14d including the flanges 37, 36 can be caused to bear against the outer races 29, 30 with a selected force to thus eliminate play (if any) between the fourth housing (section 14d) and the races 29, 30. The above undertakings are desirable and advantageous in order to permit a reduction of the play (particularly radial play) of the rotor 6 in the housing 2.

The provision of a plurality of discrete antifriction bearings (25, 26) for each stub 24 is desirable and advantageous because this flattens the line of flexing (if any) of the shaft 7 in the rotor 6. In other words, by increasing the number of antifriction bearings for the shaft 7 and by assembling such bearings into sets of coaxial bearings which are adjacent each other in the axial direction of the shaft 7, one can reduce the maximum extent of flexibility of the shaft in actual use of the improved rotary feeder 1. This, in conjunction with the aforediscussed reduction of radial play of the rotor 6, contributes to a pronounced reduction of stresses (and thus reduces the wear) upon the seals 13 and the gaskets 18 of the two improved sealing devices.

The aforementioned sealing elements 39, 40 and 41 are disposed between the antifriction bearings 25, 26 and the respective end wall 9 of the rotor 6. These sealing elements are provided in the third housing portion 14c and surround the larger-diameter portion of the respective stub 24. The sealable passage 42 in the third housing portion 14c forms part of means for supplying a pressurized fluid (e.g., compressed air) from a suitable source (not specifically shown) to the plenum chamber 23. The path for such pressurized fluid extends along the sealing element 41. The outlet of the passage 42 is located between the sealing elements 40 and 41. This outlet communicates with a narrow clearance between the internal surface of the sealing element 41 and the peripheral surface of the stub 24 to permit compressed air to flow into and to raise the pressure in the plenum chamber 23 to a preselected value. Such pressure is communicated to the plenum chamber 20 through the channel 21, and the pressure in the chamber 20 is determined by the flow restrictor 22.

Compressed air which is admitted into the plenum chamber 20 through the channel 21 and flow restrictor 22 flows along the helical passage 19 (which is defined by the gasket 18) and thence into the inlet 3 or outlet 4 of the rotary feeder 1. The quantity of air which escapes into the inlet 3 or into the outlet 4 is determined by the flow restrictor 22 which is preferably dimensioned in such a way that the pressure in the chamber 20 only slightly exceeds the pressure at the outlet 4 (it being assumed that the pressure at the outlet 4 is higher than the pressure at the inlet 3). A relatively small flow of air through the chamber 20 and passage 19 along the internal surface of the gasket 18 normally suffices to expel any solid particles which happen to penetrate into the just described path when the rotary feeder 1 is use. The magnitude of pressure in the plenum chamber 23 is dependent upon the desired pressure of the fluid flowing in the helical passage 19 at the internal surface of the gasket 18. It is desirable to ensure that the pressure differential between the two sides of the seal 13 (as seen in the axial direction of the shaft 7) be relatively small in order to reduce the stress upon and to prolong the useful life of the member 13. As a rule, the pressure in the plenum chamber 23 is higher than at the inlet 3 or at the outlet 4; this ensures that the seal 13 is acted upon by pressure in a single axial direction of the shaft 7.

Though the flow of air or another flushing fluid through the helical passage 19 involves a continuous loss of a relatively small quantity of pressurized fluid, such losses are more than compensated for by the advantage of effecting a highly satisfactory cleaning of the improved rotary feeder as a result of continuous expulsion of solid particles, i.e., such particles are highly unlikely to reach the seal 13 and the useful life of this seal is prolonged accordingly. The helical passage 19 establishes a relatively long path which offers a rather high resistance to the flow of compressed fluid so that losses due to the escape of such fluid into the inlet 3 and/or into the outlet 4 are minimal. At the same time, the helical passage 19 ensures that the entire internal surface of the gasket 18 is continuously relieved of solid particles which are entrained into the inlet 3 and/or into the outlet 4.

An important advantage of the improved rotary feeder is that the sealing engagement between the seals 13 and the respective peripheral surfaces 12 is satisfactory regardless of eventual radial displacement of the rotor 6 from its central position. This is due to the fact that the seats 16 have a certain freedom of movement in the respective grooves 15 so that they can maintain the internal surfaces of the seals 13 in requisite sealing engagement with the adjacent end walls 9. If desired, each end wall 9 can be engaged by two or more radially movable seals 13. The elasticity of each seat 16 is sufficient to ensure that the seals 13 immediately compensate for any radial movements of the end walls 9 relative to the adjacent first portions 14 of the housing 2, i.e., that each of the two sealing devices responds without delay. At the same time, each seat 16 prevents any leakage of air or another fluid through the respective groove 15, i.e., each seat 16 is in permanent sealing engagement with the surfaces bounding the respective groove 15 as well as with the external surface of the respective seal 13. The provision of circumferentially complete ring-shaped seats 16 is preferred at this time because this simplifies the installation of such seats in the respective grooves 15 and ensures that each seat is in adequate sealing engagement with the entire external surface of the respective seal 13.

The material and the initial stressing of the seats 16 will be selected with a view to ensure the establishment and maintenance of satisfactory sealing engagement of the entire internal surface of each seal 13 with the respective peripheral surface 12 as well as that each portion of each seat 16 remains at least slightly stressed even if the rotor 6 is caused to move away from its central position so that the seat 16 is free to expand at one side while being compelled to undergo a rather pronounced compressive stress at the diametrically opposite other side of the shaft 7. All that counts is to ensure the establishment and maintenance of a satisfactory sealing action between each seat 16 and the housing 2, between each seat 16 and the respective seal 13 and between each seal 13 and the respective end wall 9. The feature that the seals 13 do not move with the adjacent peripheral surfaces 12 ensures that the only wear the seals 13 undergo is along their external surfaces (of contact with the adjacent end walls 9).

The gaskets 18 are particularly desirable and advantageous if the improved rotary feeder 1 is designed to transport pulverulent or other small solid particles, a mixture of very small and larger solid particles and/or larger particles which are likely to be broken up into smaller (including minute) particles during transport from the inlet 3 toward the outlet 4 and/or during transport from a source to the inlet 3. The gaskets 18 can prolong the useful life of the rotor 6 and/or reduce the need for repeated dismantling of the rotary feeder 1 for the purpose of cleaning in that they prevent solid particles from reaching the grooves 15 and the parts 13, 16 in such grooves. The feature of conveying a fluid medium (such as compressed air) along the aforedescribed paths extending from the passages 42, through the plenum chambers 23, 20, helical passages 19 and on to the inlet 3 and/or outlet 4 even further reduces the likelihood of penetration of solid particles all the way to the seals 13. All in all, the combination of the just described flushing features practically invariably prevents penetration of solid particles past the gaskets 18 and all the way to the respective seals 13. The establishment of helical passages 19 along the internal surfaces of the gaskets 18 is desirable and advantageous because this ensures that the flushing medium (such as compressed air) flows along the entire internal surface of each ring 18 in response to each revolution of the rotor 6. In other words, solid particles (if any) are expelled from the internal surfaces of the rings 18 whenever the rotor 6 completes an angular movement through 360°. Moreover, such selection of the paths along the internal surfaces of the rings 18 ensures that very small quantities of compressed fluid suffice to ensure the establishment of highly satisfactory (reliable) cleaning or flushing action. Still further, the flushing action necessitates the expenditure of small amounts of energy. Each of the helical passages 19 can have a single thread or a multiple thread.

The pressure differential between the plenum chambers 20 and 23 can be zero or more than zero, with the higher pressure in the larger plenum chambers 23. Moreover, the pressure in each chamber 23 at least matches the pressure in the inlet 3 or in the outlet 4, wherever the pressure is higher. This is desirable on the aforediscussed grounds, i.e., that the seals 13 are subjected to stresses only in one axial direction of the rotor 6 as well as that the stresses upon the seals are less pronounced than in conventional rotary feeders. It is possible to provide discrete sources of pressurized fluid for the plenum chambers 23 as well as for the plenum chambers 20. The illustrated arrangement is preferred at this time because it takes up less space and is less expensive as well as because a desired pressure differential between a plenum chamber 23 and the adjacent chamber 20 can be established and maintained in a simple and inexpensive manner and in a highly predictable way. The flow restrictors 22 can be of adjustable type; this renders it possible to select the rate of flow of pressurized fluid through the helical passages 19, i.e., the extent (intensity) of flushing action along the internal surfaces of the rings 18. The exact magnitude of pressure in the plenum chambers 23 is of no particular consequence; all that counts is to ensure proper selection of pressure in the chambers 20 and hence the rate of flow of pressurized fluid in the passages 19.

Proper journalling of the shaft 7 in the housing 2 (i.e., proper selection of bearings for the stubs 24) is of importance because this determines the extent of radial movability of the rotor 6 in the housing 2 and hence the rate of sealing action which is to be performed by the members 13 in cooperation with the associated seats 16. Thus, the extent to which the shaft 7 can be flexed in the housing 2 will determine the need for a more or less pronounced sealing action. As stated above, the provision of two or more antifriction (ball or other) bearings for each stub 24 (in such a way that the plural bearings are disposed next to each other in the axial direction of the shaft 7) is desirable because this contributes to a reduction of flexibility of the shaft 7 and thereby reduces the maximum extent of radial movability of the end walls 9. Another factor (which can be controlled by the clamping units 33, 34 and clamping means 37, 36, 38) is the extent of axial movability of the bearings 25, 26 and hence the extent of axial movability of the rotor 6.

While the application (e.g., shrinking) of the inner race of an antifriction bearing on the stub of a shaft does not present many problems, proper mounting of the outer race and of the rolling elements between the two races presents more serious problems. It has been found that the aforediscussed solution of splitting the housing (at 35) in the region of the outer races and of providing means for clamping the portions of the split section to each other ensures a very simple and highly satisfactory mounting of the shaft 7 in the bearings 25, 26 and of the bearings in the housing 2. This reduces the likelihood of uncontrolled or extensive radial play between the stubs 24 of the shaft 7 and the housing 2. The parts 33 and 34 of the clamping units cooperate with the outer races 30 and with the housing 2 to eliminate or reduce any undesirable axial play of the shaft 7 in the housing. All this contributes to lesser wear upon the seals 13 and to a more reliable sealing action between the first housing portions 14 and the end walls 9 in the region of the grooves 15. Axial adjustability of the outer races 29, 30 relative to the respective inner races 27, 28 of the antifriction bearings 25, 26 not only allows for a reduction of play between each outer race and the respective inner race but also reduces or eliminates play for the rolling elements 31 and 32 to thus even further reduce the likelihood of any stray movements of the rotor 6 relative to the housing 2.

The portions or flanges 37, 36 can constitute separately produced parts which are welded otherwise affixed to the fourth housing section 14d, or they can be of one piece with such housing section. The bolt or bolts 38 (or analogous clamping elements) can furnish a force which suffices to prevent any radial play between the fourth housing section 14d and the outer races 29, 30 of the respective antifriction bearings 25, 26.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A rotary feeder, comprising:
   a housing having an inlet, an outlet, and a chamber between said inlet and said outlet;
   a rotor installed in said chamber and having a shaft journalled in said housing, two spaced-apart end walls carded by the shaft, flanking said inlet and said outlet and having peripheral surfaces adjacent said housing, and vanes extending from said shaft between said end walls; and
   a sealing device between each of said peripheral surfaces and said housing, each of said sealing devices comprising a ring-shaped seal disposed and radially movable in a radial groove of said housing adjacent the respective peripheral surfaces and means for biasing said ring-shaped seal against the respective peripheral surfaces.

2. The rotary feeder of claim 1, wherein each of said biasing means comprises an elastomeric seat in the respective radial groove, each of said seals being disposed between the respective seat and the respective peripheral surface.

3. The star rotary feeder of claim 2, wherein each of said seats comprises a circumferentially complete ring.

4. The rotary feeder of claim 2, wherein said housing has a bottom surface in each of said radial grooves, each of said seats being in sealing engagement with the respective bottom surface and with an internal surface of the respective seal.

5. The rotary feeder of claim 2, wherein each of said seats biases an internal surface of the respective seal into frictional engagement with the respective peripheral surface with a first holding force, said seats beating against the housing in said radial grooves and against an external surface of the respective seals with a second holding force of frictional engagement which is greater than said first holding force.

6. The rotary feeder of claim 2, further comprising a gasket provided in said housing adjacent each of said peripheral surfaces, each of said gaskets defining with said housing, with the respective peripheral surface and with the respective seal an annular plenum chamber and said housing having means for supplying a pressurized fluid into said plenum chambers.

7. The rotary feeder of claim 6, wherein said gaskets are disposed between said seals as seen in the axial direction of said shaft.

8. The rotary feeder of claim 7, wherein said gaskets and the respective peripheral surfaces define fluid conveying paths.

9. The rotary feeder of claim 8, wherein at least one of said paths is a substantially helical path.

10. The rotary feeder of claim 8, wherein each of said end walls defines with said housing a fluid-containing additional chamber wherein the pressure at least matches the pressure in said plenum chambers.

11. The rotary feeder of claim 10, wherein each of said seals is disposed between the respective plenum chamber and the respective additional chamber as seen in the axial direction of said shaft.

12. The rotary feeder of claim 11, wherein said means for supplying pressurized fluid to said plenum chambers is connected to said additional chambers.

13. The rotary feeder of claim 11, further comprising channels connecting said plenum chambers with the respective additional chambers.

14. The rotary feeder of claim 13, further comprising a flow restrictor in at least one of said channels.

15. A rotary feeder comprising:
a housing having an inlet, an outlet, and a chamber between said inlet and said outlet;
a rotor installed in said chamber and having a shaft journalled in said housing, two spaced-apart end walls carded by the shaft, flanking said inlet and said outlet and having peripheral surfaces adjacent said housing, and vanes extending from said shaft between said end walls, each of said end walls defining with said housing a fluid-containing additional chamber wherein the pressure at least matches the pressure in said plenum chambers;;
a sealing device between each of said peripheral surfaces and said housing, each of said sealing devices comprising a ring-shaped seal disposed and radially movable in a radial groove of said housing adjacent the respective peripheral surfaces and means for biasing said ring-shaped seal against the respective peripheral surfaces, each of said biasing means comprises an elastomeric seat in the respective radial groove, each of said seals being disposed between the respective seat and the respective peripheral surface;
a gasket provided in said housing adjacent each of said peripheral surfaces, each of said rings defining with said housing, with the respective peripheral surface and with the respective seal an annular plenum chamber and said housing having means for supplying a pressurized fluid into said plenum chambers, wherein said gaskets are disposed between said seals as seen in the axial direction of said shaft, said gaskets and the respective peripheral surfaces defining fluid conveying paths, each of said seals being disposed between the respective plenum chamber and the respective additional chamber as seen in the axial direction of said shaft; and
channels connecting said plenum chambers with the respective additional chambers, at least one of said channels being provided in the respective end wall.

16. A rotary feeder comprising:
a housing having an inlet, an outlet, and a chamber between said inlet and said outlet;
a rotor installed in said chamber and having a shaft journalled in said housing, two spaced-apart end walls carried by the shaft, flanking said inlet and said outlet and having peripheral surfaces adjacent said housing, and vanes extending from said shaft between said end walls; and
a sealing device between each of said peripheral surfaces and said housing, each of said sealing devices comprising a ring-shaped seal disposed and radially movable in a radial groove of said housing adjacent the respective peripheral surfaces and means for biasing said ring-shaped seal against the respective peripheral surfaces, wherein said shaft has at least one stub and further comprising antifriction bearing means including at least one antifriction bearing surrounding said at least one stub and installed in said housing, said housing having a fourth housing section adjacent said at least one bearing and including two portions and a slit between said portions, and further comprising means for clamping said portions of said fourth housing section to each other in a direction to narrow said slit.

17. The rotary feeder of claim 16, wherein said shaft has two stubs and said antifriction bearing means comprises at least one adjustable antifriction bearing mounted in said housing for each of said stubs, each of said beatings having an inner race surrounding the respective stub, an outer race and at least one row of antifriction rolling elements between the respective inner and outer races.

18. The rotary feeder of claim 16, wherein said at least one bearing comprises an inner race surrounding said at least one stub, an outer race and at least one row of antifriction rolling elements between said races, and further comprising an adjustable clamping unit for said races, said unit being operable to permit axial adjustment of at least one of said races relative to another of said races.

19. The rotary feeder of claim 16, wherein said antifriction beating means includes a plurality of antifriction bearings for said at least one stub.

20. The rotary feeder of claim 16, wherein said portions of said fourth housing section include flanges which confront each other across said slit, said clamping means comprising at least one threaded fastener connecting said flanges to each other.

21. The rotary feeder of claim 16, further comprising an annular sealing element disposed in said housing and surrounding said at least one stub between said at least one bearing and one of said end walls, said one end wall and said housing defining a plenum chamber and further comprising means for supplying to said plenum chamber a pressurized fluid past said annular sealing element.

22. A rotary feeder comprising a housing having an inlet, an outlet and a chamber between the inlet and the outlet; a rotor installed in said chamber and including a shaft having at least one stub in said housing, two spaced-apart end walls provided on said shaft adjacent said housing and flanking said inlet and said outlet, and vanes extending from said shaft between said end walls; antifriction bearing means including at least one antifriction bearing surrounding said at least one stub in said housing, said housing having a section adjacent said at least one bearing and including two portions and a slit between said portions; and means for clamping said portions of said housing section to each other in a direction to narrow said slit.

23. The rotary feeder of claim 22, wherein said shaft has two stubs and said antifriction bearing means comprises at least one antifriction bearing mounted in said housing for each of said stubs, each of said bearings having an inner race surrounding the respective stub, an outer race and at least one row of antifriction rolling elements between the respective inner and outer races.

24. The rotary feeder of claim 22, wherein said at least one bearing comprises an inner race surrounding said at least one stub, an outer race and at least one row of antifriction rolling elements between said races, and further comprising an adjustable clamping unit for said races, said unit being operable to permit axial adjustment of at least one of said races relative to another of said races.

25. The rotary feeder of claim 22, wherein said antifriction bearing means includes a plurality of antifriction bearings for said at least one stub.

26. The rotary feeder of claim 22, wherein said portions of said housing section include flanges which confront each other across said slit, said clamping means comprising at least one threaded fastener connecting said flanges to each other.

27. The rotary feeder of claim 22, further comprising an annular sealing element disposed in said housing and surrounding said at least one stub between said at least one bearing and one of said end walls, said one end wall and said housing defining a plenum chamber and further comprising means for supplying to said plenum chamber a pressurized fluid past said annular sealing element.

* * * * *